(12) United States Patent
Randal et al.

(10) Patent No.: US 7,277,905 B2
(45) Date of Patent: Oct. 2, 2007

(54) SYSTEM AND METHOD FOR A CONSISTENCY CHECK OF A DATABASE BACKUP

(75) Inventors: Paul S. Randal, Snohomish, WA (US); Michael James Zwilling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 549 days.

(21) Appl. No.: 10/814,459

(22) Filed: Mar. 31, 2004

(65) Prior Publication Data

US 2005/0223043 A1 Oct. 6, 2005

(51) Int. Cl.
*G06F 17/30* (2006.01)
(52) U.S. Cl. ....................... 707/204; 707/202
(58) Field of Classification Search ............... 707/204, 707/202
See application file for complete search history.

(56) References Cited

U.S. PATENT DOCUMENTS

| | | | |
|---|---|---|---|
| 4,674,065 A | 6/1987 | Lange et al. | |
| 5,267,155 A | 11/1993 | Buchanan et al. | |
| 5,392,386 A | 2/1995 | Chalas | |
| 5,815,830 A | 9/1998 | Anthony | |
| 5,859,636 A | 1/1999 | Pandit | |
| 5,946,647 A | 8/1999 | Miller et al. | |
| 6,085,201 A | 7/2000 | Tso | |
| 6,185,569 B1 | 2/2001 | East et al. | 707/101 |
| 6,408,310 B1 | 6/2002 | Hart | |
| 6,662,357 B1 | 12/2003 | Bowman-Amuah | |
| 6,959,369 B1 * | 10/2005 | Ashton et al. | 711/162 |
| 2003/0061537 A1 * | 3/2003 | Cha et al. | 714/16 |

OTHER PUBLICATIONS

Novell® GroupWise™ User's Guide for Windows 16-Bit, Version 5.2, 1993-1997, 1-231.
Novell® Group Wise™ User's Guide for Windows 32-Bit, 1998, Novell, Inc., 1-318.
Claris for Macintosh, Claris Emailer Getting Started, 1995-1997, Claris Corporation, 61 pages.
Developer's Guide to Apple Data Detectors-For Version 1.0.2, © Apple Computer, Inc., 1997, 1-34.
Apple Data Detectors User's Manual, © 1997 Apple Computer, Inc., 1-16.
Nardi, B.A. et al., "Collaborative, Programmable Intelligent Agents", Mar. 1998, Apple Computer advanced Technology Group, 1-11.
Willisson, Pace, et al., ISPELL: UNIX Man Pages, Aug. 23, 2003, 73 pages.

(Continued)

*Primary Examiner*—Alford W Kindred
(74) *Attorney, Agent, or Firm*—Woodcock Washburn LLP (57) ABSTRACT

A method for performing a consistency check on a database backup of a database is performed without requiring a full recovery of the original database from the database backup. Instead, a database view may be used as a smaller storage requirement tool for providing a transaction-consistent view of portions of an existing full database backup. The database view, in combination with the database backup and transaction log, contains all the information necessary to perform a consistency check on the database backup without a full reconstitution of the original database from the database backup. The consistency check may be run on the database view along with the database backup to verify the integrity of the full database backup to add improved reliability to a database recovery scheme.

35 Claims, 6 Drawing Sheets

OTHER PUBLICATIONS

SED(1), BSD Reference Manual, sedMan.txt, 6 pages.

McMahon, L.E., "SED-A Non-Interactive Text Editor", *Bell Laboratories*, Aug. 15, 1978, 10 pages.

The Complete Red Hat® Linux™ Operating System 5.2 Deluxe, Macmillan Digital Publishing, U.S.A., 385 pages.

CoStar User's Manual, "for AddressMate and AddressMate Plus", CoStar Corp., 1994-1995, pp. 1-1 thru Index-210.

Beitner, N.D. et al., "Multimedial Support and Authoring in Microcosm: An Extended Model", Department of Electronics and Computer Science, University of Southampton, 12 pages.

IBM Research Disclosure #368, "Multimedia Hyperlinks Automatically Created for Reference Documents", Jun. 1993, 5 pages.

Microsoft® Office 97 User's Manual, "Getting Results with Microsoft® Office 97-Real World Solutions for the Work You Do", 1997, 1-703.

Corel® Corporation Limited, Corel® InfoCentral User's Manual, 1996, vol. 1, Version 7.0, 1996, 1 thru 86.

Corel® Office Professional 7 Quick Results, 1-531.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 202, 500-511.

* cited by examiner

Prior Art

SYSTEM AND METHOD FOR A CONSISTENCY CHECK OF A DATABASE BACKUP

REFERENCE TO PATENTS AND CO-PENDING APPLICATIONS

The following references have some subject matter in common with the current application:

U.S. Pat. No. 6,185,569 to East et al. issued Feb. 6, 2001 entitled "Linked Data Structure Integrity Verification System Which Verifies Actual Node Information with Expected Node Information Stored in a Table" commonly assigned with the present application.

Co-Pending patent application Ser. No. 10/611,774 filed Jun. 30, 2003 entitled "Transaction Consistent Copy-On-Write Databases" commonly assigned with the present application.

FIELD OF TILE INVENTION

This invention relates in general to the field of computer databases. More particularly, this invention relates to database backup integrity verification systems.

BACKGROUND OF THE INVENTION

Modem databases can be key tools which assist users in keeping track of critical business transactions. In many cases, database loss can be disastrous to an enterprise. A database loss may precipitate from multiple causes; hardware failure, software failure, facility failure, or natural disasters affecting any of the other supporting structures for the database. Thus, database recovery after a loss is an important aspect of proper database management. In one aspect of database management, full database backups are typically made on periodic intervals, such as weekly, to provide a backbone for recovery. Having a functional full database backup is a requirement for applying the partial, differential daily database backups needed to recover a database to the day just preceding the database loss.

Typically, database administrators make a weekly full database backup and store the backup to some type of media. Often, that media is magnetic tape. This weekly full database backup is the backbone of a recovery mechanism for the database. However, a question may remain as to whether the database backup, as stored on the media, is corrupted or not. A corrupted database backup may not be fully recoverable. One prior art method to check the viability of a database backup is to reconstitute the database backup into a second working copy of the original database and perform tests on that database. This method is expensive in terms of resources because modem databases may be of the terabyte size. Often an enterprise may not have an unused second terabyte of disk or random access storage media casually available upon which to perform a database backup integrity check. However, such an integrity check is vital to the reliability of a database backup strategy.

These vital tests on a database may include tests on its internal linked data structures. Linked data structures, such as B-trees, are logical arrangements of data that facilitate efficient and organized data storage, data manipulation, and data retrieval. The basic component of a linked data structure is known as an element or node. Individual nodes in a linked data structure are linked together by special fields called pointers that identify or "point to" neighboring nodes in a linked structure of nodes. A pointer is also sometimes referred to as reference.

Each node of a linked data structure must be accurately represented because logically neighboring nodes of a linked data structure are not necessarily stored in adjacent physical locations on a storage device. Absent a guarantee of physical proximity from one node to the next on a storage device, it is difficult to know which node is actually the next logical node in a linked data structure if an invalid pointer exists. Thus, a pointer that does not correctly point to a next logical node within the linked data structure can render the entire linked data structure unreliable and unusable.

Figure 1:
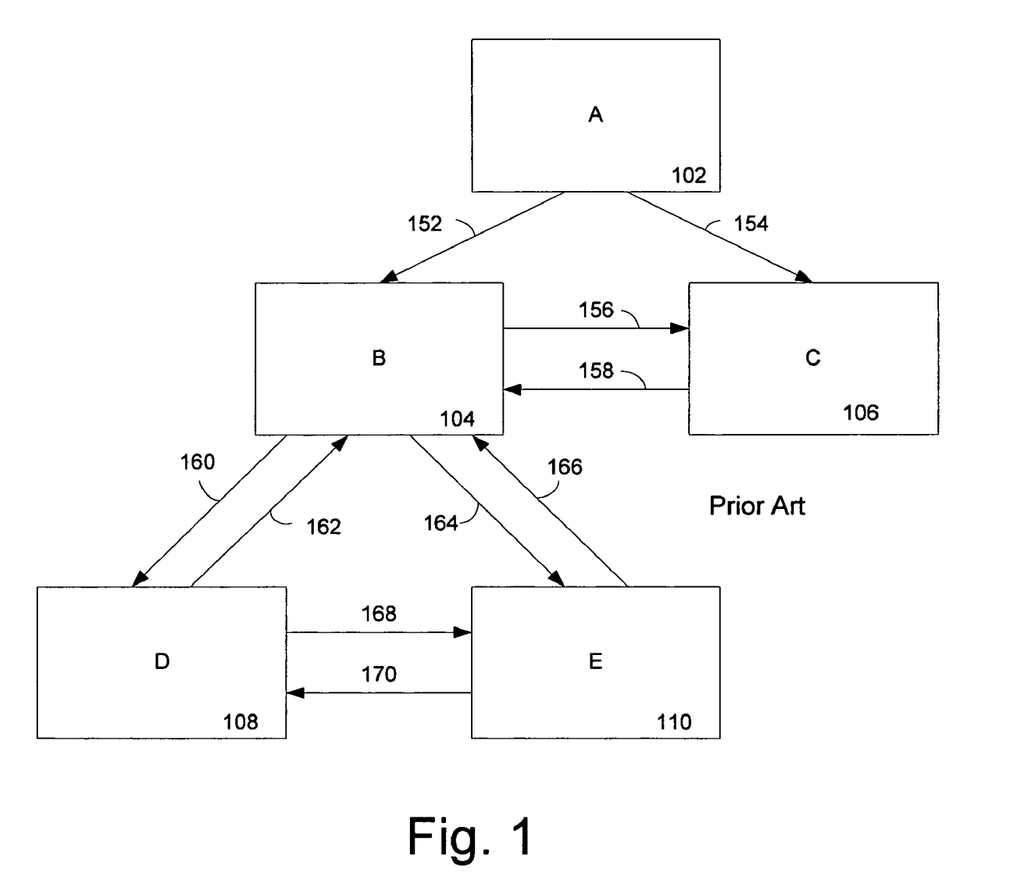
FIG. 1 is a block diagram of a typical database structure that must be validated for correctness.

FIG. 1 depicts a basic B-tree structure in a database showing multiple links and requiring multiple pointers. Database nodes A, B, C, D and E (102, 104, 106, 108, 110 respectively) may have hierarchical relationships to one another supported via pointers. For example, the root node, A 102, has two child nodes B 104 and C 106 with pointers 152 and 154 respectively. Nodes B and C are siblings and may have forward and back pointers 156 and 158. Leaf nodes D 108 and E 110 are child nodes of node B 104 and may also have forward and back pointers 160 and 162 between B and D and pointers 164 and 166 between nodes B and E. Nodes B and E are siblings to each other and may have forward and back pointers 168 and 170. If pointers 164 and 168 between nodes B and E and D and E respectively were lost or incorrect, the link to node E from either node B or D would be lost. This would result in a loss of a corresponding data association in a database.

In general, if any pointer in a linked data structure becomes corrupted or otherwise invalid so that a pointer does not correctly point to what is intended as the next node or child node, then the integrity of the entire data structure is compromised. A compromised data structure is neither reliable nor usable. Although it is possible to identify an invalid pointer in a small linked data structure having only a few nodes, the task becomes very complex and costly in terms of time and/or computing resources for large linked data structures having millions of nodes, and more difficult still if more than one invalid pointer exists among the nodes.

It is therefore vital to verify the consistency of such pointers in a database. Additionally, it is vital to perform a consistency check on the database backup to verify the integrity of the database backup and to guarantee that a full recovery is possible. However, there may be practical problems in running a consistency check on a backup of a database.

Figure 2:
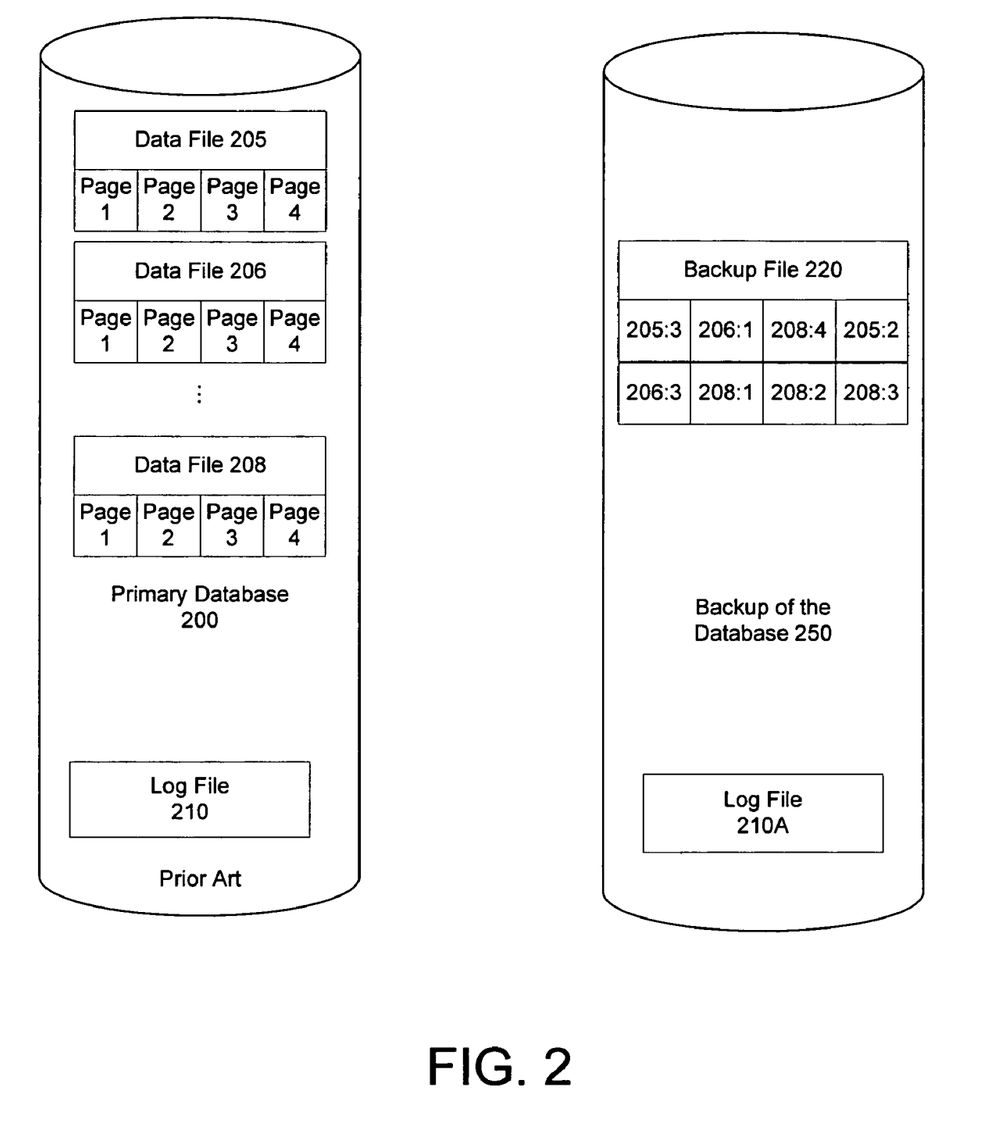
FIG. 2 is a block diagram of a typical backup of a database.

FIG. 2 depicts a typical database 200 containing data files 205, 206, 208 and a log file 210. The data files are further divided into storage blocks, also referred to as pages. These storage blocks hold the records in a database and hold the nodes associated with linked data structures such as B-trees. A typical database backup 250 of the database 200 may not necessarily contain backups of all the literal data files 205, 206, 208 that make up the database 200. Instead, a database backup merely needs to contain the blocks currently in use from the data files in some, possibly different, order and format. For example, the database backup 250 contains backup file 220, which is a backup of data files 205-208 in the original database 200. Data file 205 may contain many thousands of pages but only a few pages (illustrated in FIG. 2 using the descriptive numerical notation "data file: page") may be used by the database 200. In the example of FIG. 2, backup file 220 in database backup 250 will only contain two pages from data file 205; namely 205:3 and 205:2. A similar situation may also exist for data files 206 and 208. Thus, a database backup may not be a convenient or compatible environment or form for running a consistency check. A log file 210A may generally be associated with a database backup 250 of the database 200 to provide details of any transactions that changed the database 200 at the time when the database backup was being placed onto storage media.

Using prior art principles, to check a database backup, the database must be reconstituted from the database backup, the transaction log must be applied to the reconstituted database backup to recover a database to the state that existed when the database backup operation was complete and then consistency checks must be run. The disk or random access storage space required to perform this type of verification of a database backup is at least as large as the original database and requires a great amount of time because prior art consistency checks are time consuming as they require multiple passes through the database in the verification of such items as linking pointers and finding pages containing storage allocation maps and database schema metadata. This task may become even more ominous when a sequential media such as tape is used for the database backup.

Thus, there exists a need for a system or method which will allow a storage space and time efficient method of verifying the integrity of a full database backup. The present invention addresses the aforementioned needs and solves them with additional advantages as expressed herein.

SUMMARY OF THE INVENTION

The invention realizes a system and method to perform a consistency check of a database from a backup of the database while using much less storage space than the original database. Performing consistency checks on a database backup is useful to verify the integrity of a database backup so that a full recovery may be made by a system administrator if a reconstitution of the original database becomes necessary. The method includes the identification of pages needed for a creation of a database view containing only the database schema metadata and the subsequent creation of the database view. Once the database view is created, the database view may be brought to a transaction consistent point by adding in the transaction log of the database backup and performing redo operations along with selected undo operations. Pages involved in redo or undo are also placed in the database view. Once a transaction consistent database view is established, one or more consistency checks may be performed on the database contained in the database backup by reading the correct version of pages from either the database backup or the database view, whichever has the corrected data. The invention adds a measure of reliability to a recovery policy by validating the integrity of the database backup and thus ensuring that a recovery may be performed from a full backup of a database.

After discussing an exemplary database view using FIG. 3, exemplary methods and embodiments will be discussed in conjunction with FIGS. 4-5. An exemplary computing environment is also discussed in conjunction with FIG. 6.

BRIEF DESCRIPTION OF THE DRAWINGS

The foregoing summary, as well as the following detailed description of preferred embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

One embodiment of the present invention realizes a method to perform a consistency check of a database contained in a database backup while using less storage space than the original database. In the context of the present invention, the term storage space may be any of the forms of storage discussed with regard to the exemplary computing environment of FIG. 6 including, but not limited to, sequential storage, disk storage, and random access storage and its equivalents.

A consistency check of a backup of an original database may be accomplished, according to an embodiment of the invention, via the use of a database view derived from the backup of the database and its corresponding transaction log file. In the current embodiment, the database view produces a transaction consistent view of the original database at a point in time when the backup of the original database was made by applying the transaction log contained in the database backup. Once a transaction consistent view is available, the present invention runs a consistency check against the database backup. As the consistency check is being performed, pages from the database backup may be read first and then a check of whether a transaction consistent copy of the same page exists in the database view may be performed. If the page exists in the database view, then that page is used. Otherwise, the page from the database backup may be used to perform the consistency check. The results of the database consistency check allow a system administrator to verify that a full, workable copy of the database may be recovered from the database backup.

The present invention finds utility in the verification that the backup made of a database is self consistent and useable to recover the original database should the original database fail. The invention may be most advantageously used where the database backup is stored on sequential media, such as magnetic tape or other serial type reading mechanism. The database consistency check requires only two passes of the sequential storage media. One pass is used to locate identified pages either needing recovery (to bring them into a transactionally consistent state) or providing metadata to drive the consistency checks and the second pass to perform the consistency check. The present invention may also be used with disk-based or any other type of storage backup systems with advantage because the pages may be stored in very different locations in the database backup as compared to the original database. The present invention advantageously allows a system administrator to perform the consistency check on a database backup in less storage space than the original size of the database. This attribute provides an economical method of running integrity verification without recreating a second full size copy of the original database.

Exemplary Embodiments of the Invention

An advancement in the verification of the integrity of storage structures for a variety of linked data structure types including, but not limited to, linked lists, and primary and secondary index trees is disclosed in U.S. Pat. No. 6,185,569 to East et al. issued Feb. 6, 2001 entitled "Linked Data Structure Integrity Verification System Which Verifies Actual Node Information with Expected Node Information Stored in a Table". This commonly assigned issued patent discloses a time efficient method of performing a consistency check on a database and is hereby incorporated by reference in its entirety.

An advancement in the viewing of databases in a transaction consistent manner without creating a complete copy of the database is disclosed in co-pending patent application Ser. No. 10/611,774 filed Jun. 30, 2003 entitled "Transaction Consistent Copy-On-Write Databases". This commonly assigned issued patent discloses a storage space efficient method of providing a database view and is hereby incorporated by reference in its entirety. A database view provides a transaction-consistent view of a database at a previous point in time without creating a complete copy of the database.

In an aspect of the present invention, a database view is used as a tool to produce a view of the metadata needed to check the consistency of a database. The database view is also used to store the pages that need the application of redo and undo operations from the transaction log to make the pages transactionally consistent. Such a database view, in combination with the database backup, contains all the information necessary to produce a copy of the original database at the time the full database backup operation completed. The database view, however, does not in itself contain all of the information, and thus can be smaller in size than a full copy of the original database.

In the context of the current invention, the database view includes at least one sparse file corresponding to each data file in the database represented in the database backup. In a sparse file only the portions of the file that are actually needed are written into storage space. All other regions of the file are unallocated. A sparse file may contain a copy of any pages necessary from the database backup. Using sparse files provides one possible embodiment and it avoids the need for a table mapping the offset of the pages in the original data file to their location in the sparse file. Another possible embodiment is to use a regular file, call it a side file, where pages required for the view are placed one after the other in the side file and a mapping table is used to map a page with a given ID to a location in the side file.

It is preferable that the metadata, schema or catalog data for the database be available in its entirety for a consistency check operation. The metadata, as stored in the database backup, is generally in a form where it is not usable by the database system because the pages containing it are dispersed within the files of the database backup and there is no efficient way to locate them. Moreover, there are certain pages in the database backup that either need operations redone or undone on them because they were affected by transactions that were active at the time of the database backup operation. The consistency check cannot be run until these pages are brought to a consistent state. In one embodiment, the database view is preferably used as the environment where the metadata, schema or catalog pages are conveniently located and is the environment where the pages needing redo or undo operations performed from the transaction log are located.

The invention is described with reference to pages as the unit of data in the database backup; however, it is contemplated that other units of data for the original database may be used.

During the consistency check, every page in the database backup must be examined. A check must be made to determine if a transactionally consistent version of the same page exists in the previously created database view. If it does, the version of the page from the database view must be used to perform the consistency check. In order to determine which version of a particular page to use, the presence of valid version of the page in the database view must be ascertained. In one embodiment, the database view is read directly to ascertain if such a valid version of the page exists.

In another embodiment, a side file mapping table is created which stores data regarding whether a version of a given page exists in the database view and is valid. The side page table of the database view allows a fast determination of whether a given page exists in the database view.

Figure 3:
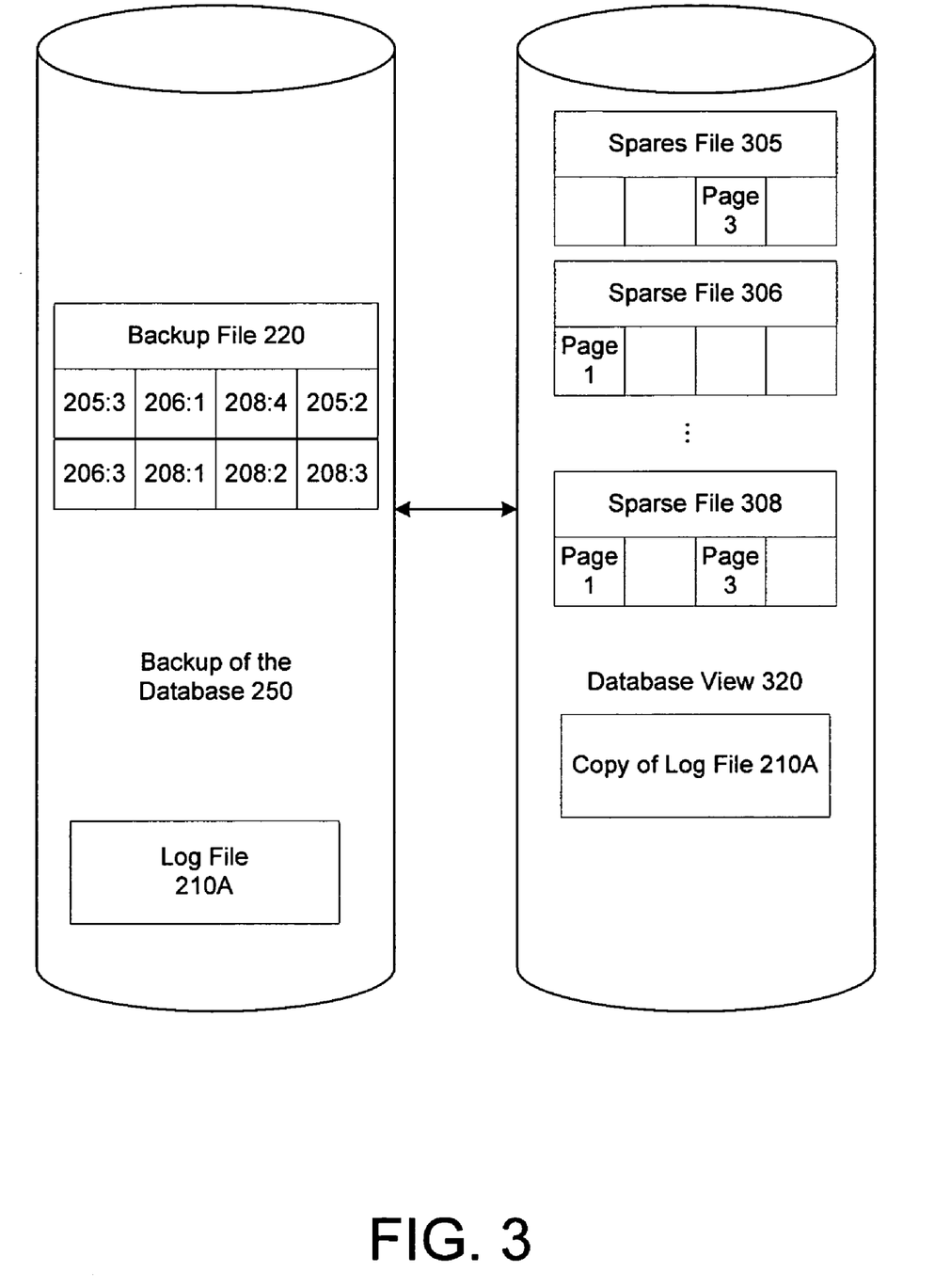
FIG. 3 is a block diagram depicting the database view aspect of the present invention.

As shown in FIG. 3, the database view 320 of the database contained within the database backup 250 consists of sparse files 305, 306 and 308. Each of the data files (205, 206 and 208) in the database backup has a corresponding sparse file (305, 306 and 308 respectively) in the database view 320. A copy of the log 210A may also included in the database view to make performing redo and undo operations easier. In another embodiment, a separate side page table exists for each of the side files in the database view.

As previously discussed, the transaction log 210 is a serial record of all the transactions that have been performed against the original database 200 since the database backup operation started until it was completed. The transaction log is used to recover the database view to the point at which the database backup operation of the original database 200 was completed. The transaction log may contain both completed transactions, that is, both started and committed, as well as incomplete transactions, that were started but not committed. Incomplete transactions are also known as uncommitted transactions.

Uncommitted transactions may cause transaction inconsistency as some modifications of data files may not have been written from the buffer cache to the data files, and there may be some modifications from incomplete transactions in the data files. The log file is used to ensure that a recovery of the database is transaction consistent. This is done using an ARIES (Algorithms for Recovery and Isolation Exploiting Semantics)-style recovery. Every modification recorded in the transaction log which may not have been written to the data files is rolled forward by performing the modification on the database. To ensure the integrity of the database, every incomplete transaction found in the transaction log is rolled back by undoing the modification on the database.

Figure 4:
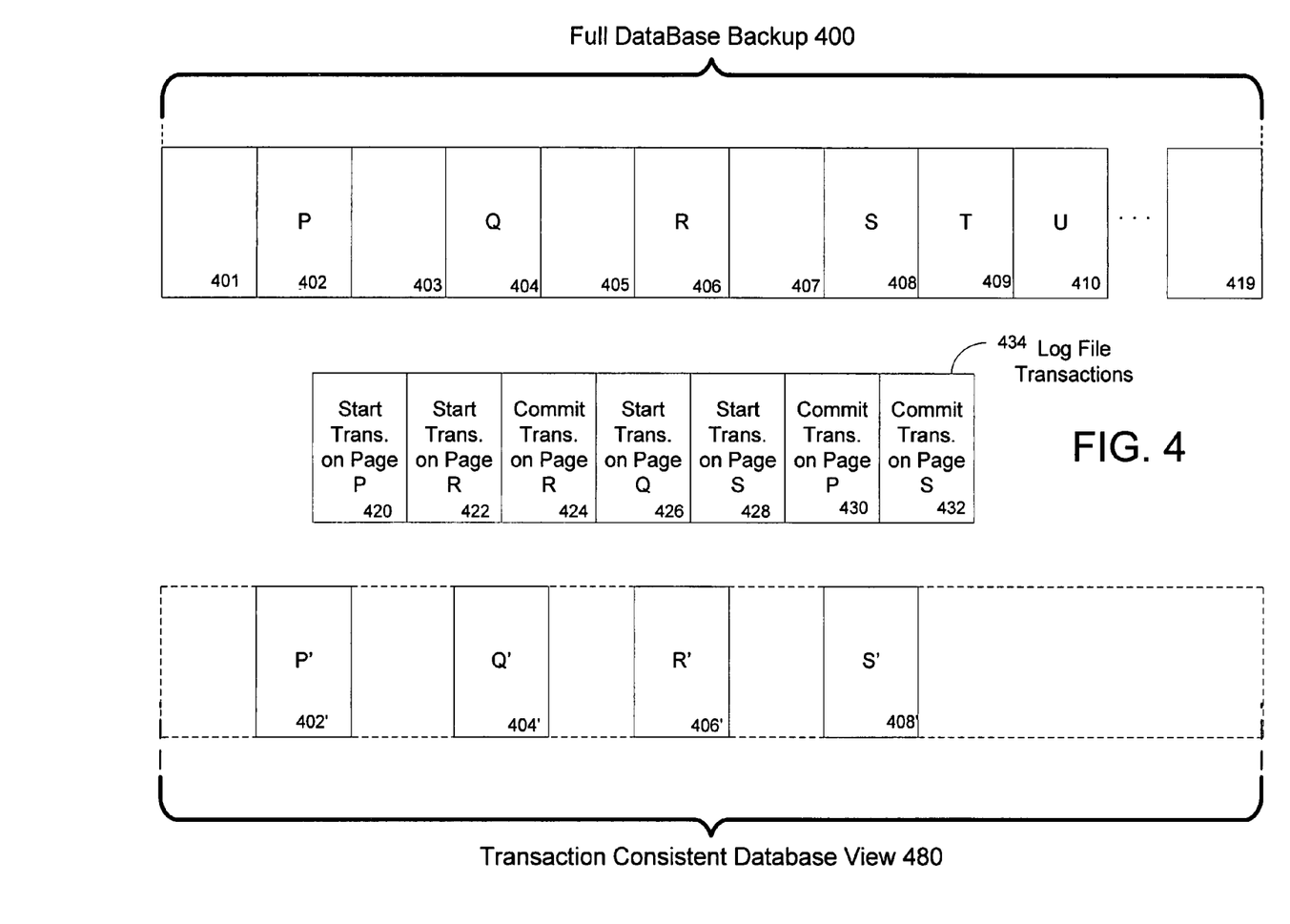
FIG. 4 is a block diagram depicting exemplary pages of a database view.
Figure 5:
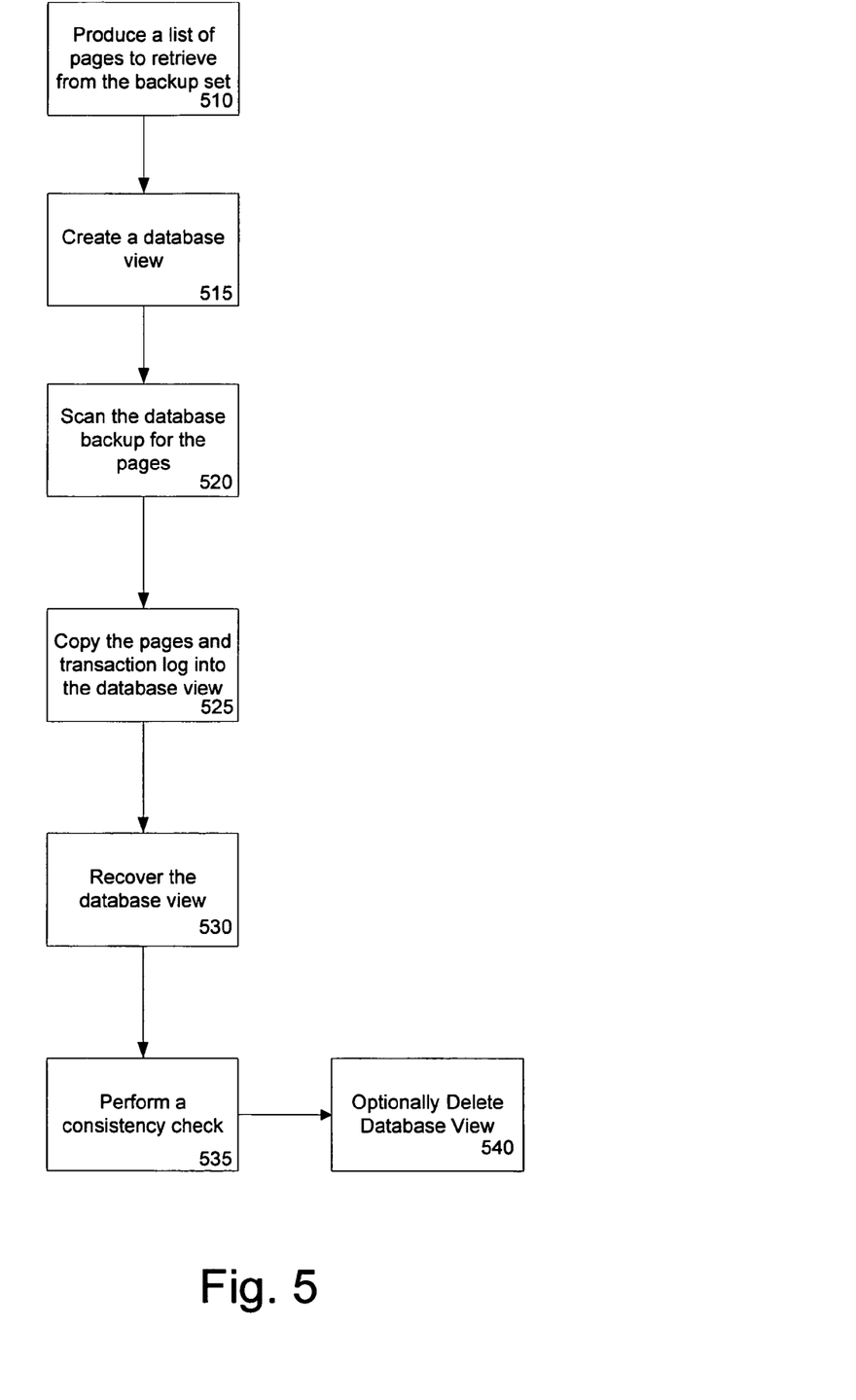
FIG. 5 is an exemplary flow diagram for a method of the present invention.

FIG. 4 depicts an example of the generation of a transaction consistent database view derived from a full database backup and a transaction log file. The database backup 400 represents a full backup of a database including all of the pages 401-419 of an exemplary database. During the database backup operation, a transaction log 434 was serially generated which recorded all of the transactions that occurred while the database backup operation was in progress. The example transaction log 434 recorded that transactions occurred on pages P 402, Q 404, R 406 and S 408 of the database during the generation of the database backup. The transaction log recorded that a transaction on page P was started at log record 420 and the transaction was committed (or completed) at log record 430. Similarly, a transaction on page R was started at log record 422 and committed at log record 424, and a transaction on page S was started at log record 428 and committed at log record 432. However, only a start log record 426 for a transaction on page Q was recorded. There was no commit log record for the transaction on page Q recorded by the time the database backup operation was completed. Therefore, there is a transaction inconsistency with regard to the transaction on page Q. The transaction on page Q should thus be rolled back to eliminate the change in the database view of the database.

A transaction consistent view 480 of the database contained in the database backup contains, among other things, those pages which represent the transaction consistent and corrected pages of the database at the time the database backup operation was complete. Thus, the modifications to redo and undo operations on pages P, Q, R and S are performed on copies of these pages, which results in pages P' 402', Q' 404', R' 406' and S' 408' in the database view 480, with mapping to the database contained in database backup 400. Note however, that not all pages are actively represented in the database view, for example T 409 and U 410, and thus the database view of the database contained in database backup 400 requires significantly less storage space than the database backup 400 or the original database.

In general, any page affected by a log record where the log record was generated after the database backup operation started may appear in the database view of the database contained in the database backup because that log record will likely need to be re-done to make the database view consistent. Furthermore, any page affected by a log record for a transaction that was still active when the database backup operation completes, such as a transaction that may need to be rolled back in the database view, may also appear in the database view because the log record will need to be undone and undoing the transaction may require altering a version of the page in the database view.

Other pages that may be copied from the database backup 400 into the database view 480 include allocation and metadata/catalog pages that describe the contents of the original database. The allocation and metadata/catalog pages may be used repeatedly during the consistency checks to follow and may need to be "cached" in the database view to avoid performance problems inherent in locating the pages repeatedly from the database backup, especially when the database backup is stored on sequential media such as magnetic tape. In general, allocation pages and metadata/catalog pages may be identified when encountered in the database backup. Typically this identification may be based on specific page IDs or a page-type flag or table ID in the page header.

Another category of pages copied from the database backup 400 into the database view 480 are pages that were changed in the database while the database backup was being created. Pages changed while the database backup operation was being performed may be identified by the transaction log that covers the time of the database backup operation and is typically included in the database backup or in a separate log backup. The transaction log may be scanned for the duration of the database backup operation based on begin/end log-sequence-number, LSNs, determined during the database backup operation and recorded in the database backup. The IDs of the pages changed may be stored in a temporary in-memory hash table or similar structure.

Another category of pages copied from the database backup 400 into the database view 480 are those necessary to perform logical undo operations such as inserting or deleting rows from B-tree indexes. For logical operations on B-trees, the additional pages are the interior pages of the B-tree. These pages can be obtained from the backup 400 and determined by the key range they cover. For example a log record for the insert of a key K into a B-tree will require all pages from the root of the index to the leaf page containing key K. The interior pages can be identified as those that cover the key range containing K. The pages are copied from the database backup 400 to the database view 480.

The application of the database view innovation to the database backup provides a way to run a consistency check against the database contained in backup 400 and represented in the database view 480 to ensure the integrity of the database backup. FIG. 5 is a flow diagram that outlines the steps to check the integrity of a database backup without restoring the database contained in the database backup into the full size storage space of the original database.

Initially, a list of all pages to retrieve from the database backup is produced (step 510). Allocation pages and metadata/catalog pages are preferably identified when encountered in the database backup. Typically this identification may be based on specific page IDs or a page-type flag or table ID in the page header. Pages which may be included in the step 510 list may include pages that were changed while the database backup operation was being performed. These changed pages may be identified by the transaction log that covers the time of the database backup operation and may typically be included in the database backup or in a separate database backup. The transaction log may be scanned for the duration of the database backup operation based on begin/end log-sequence-number, LSNs, determined during the database backup operation and recorded in the database backup. The changed pages may be stored in a temporary in-memory hash table or similar structure. The list of step 510 may also include uncommitted pages with uncommitted results identified by the transaction log. Another type of page included in the step 510 list may be pages necessary for logical undo operations which generally include allocation and metadata pages along with the interior nodes of B-trees which may be necessary for the lookup of data pages. In one embodiment, one way to restrict the potentially large number of interior node pages would be to filter them based on the keys of the records which require logical undo operations to be performed as described earlier.

A database view may then be generated as described herein (step 515). The database backup may then be scanned (step 520) to locate the pages identified in step 510. As the backup is scanned, the identified pages and the transaction log file are copied to the database view (step 525). The transaction log will be used to restore pages that were changed by transactions active while the database backup operation was in progress and to restore them to a consistent point. This point may typically be as of the time of the end of the database backup operation. Next, the recovery to a transaction consistent state involves performing redo operations against the database view as part of step 530. The transaction log file is also analyzed to discover incomplete or uncommitted transactions. The uncommitted transactions may be rolled back by performing undo operations as part of step 530. The effects of redoing and undoing log records are reflected on the copy of the pages stored in the database view.

The procedure to this point has produced a transaction consistent database view of a database contained in a database backup in much less storage space than the original database. Next, one or more database consistency checks may be run (step 535) against a combination of the database view and database backup thus checking the integrity of the database backup without a full restoration of all of the pages of the database contained in the database backup. In one embodiment, performing the consistency checks involves reading all the database pages from the database backup or database view, in the order they are stored on the backup media, just as if they were stored in the restored database or a regular database view. In this process, for every page in the database, if it is a page that needs a consistency check (i.e. contains table/index data), the page may be read from the database backup and a' check may be made to see if there is an altered copy of the page in the database view. If so, the altered copy may be used for the consistency check. Otherwise, the page read from the database backup may be used. This procedure may be preferred because pages may not be stored in an order in the database backup that allows quickly reading a specific page.

It is possible for a page to not be contained in the database backup, but be referred to in the transaction log. This transaction log reference may typically be made by a log record that allocates and formats the page as a new page for the database. Thus, the algorithm for step 535 includes reading every page from the database view that was not contained in the database backup. This is easy to do by a couple different means. One embodiment may have an in-memory table track all pages read from the database view as stated above. Then add any pages that were not read. In another embodiment provides an alternative if the in-memory table gets too big; each page in the database view could be marked with a flag bit in the header of the page indicating that it had been checked already. Finally, the database view may optionally be deleted after completion of the consistency check (step 540).

If a consistency check passes, the database administrator may be assured that the database backup of the database is of sufficient quality to permit a full database restoration from the database backup if a reconstitution of the database from the database backup is needed. This is valuable in that the integrity of the database backup is a known quantity which can be relied upon. If the consistency check fails, the database administrator has several options. One option may be to re-perform the database backup to overcome the consistency check failure. Such failures can be the result of a faulty storage media or other problems.

Another option can be to fix the specific consistency errors encountered in the database backup by making modifications to the database backup so that the recovered database, as seen in the database view may pass the consistency checks run against the database view. This option is preferably applied on corrections made to pages that were not involved in redo and undo operations. The modified database backup may then have the full integrity needed for a subsequent full database recovery if a reconstitution of the database from the database backup is needed.

Exemplary Computing Device

Figure 6:
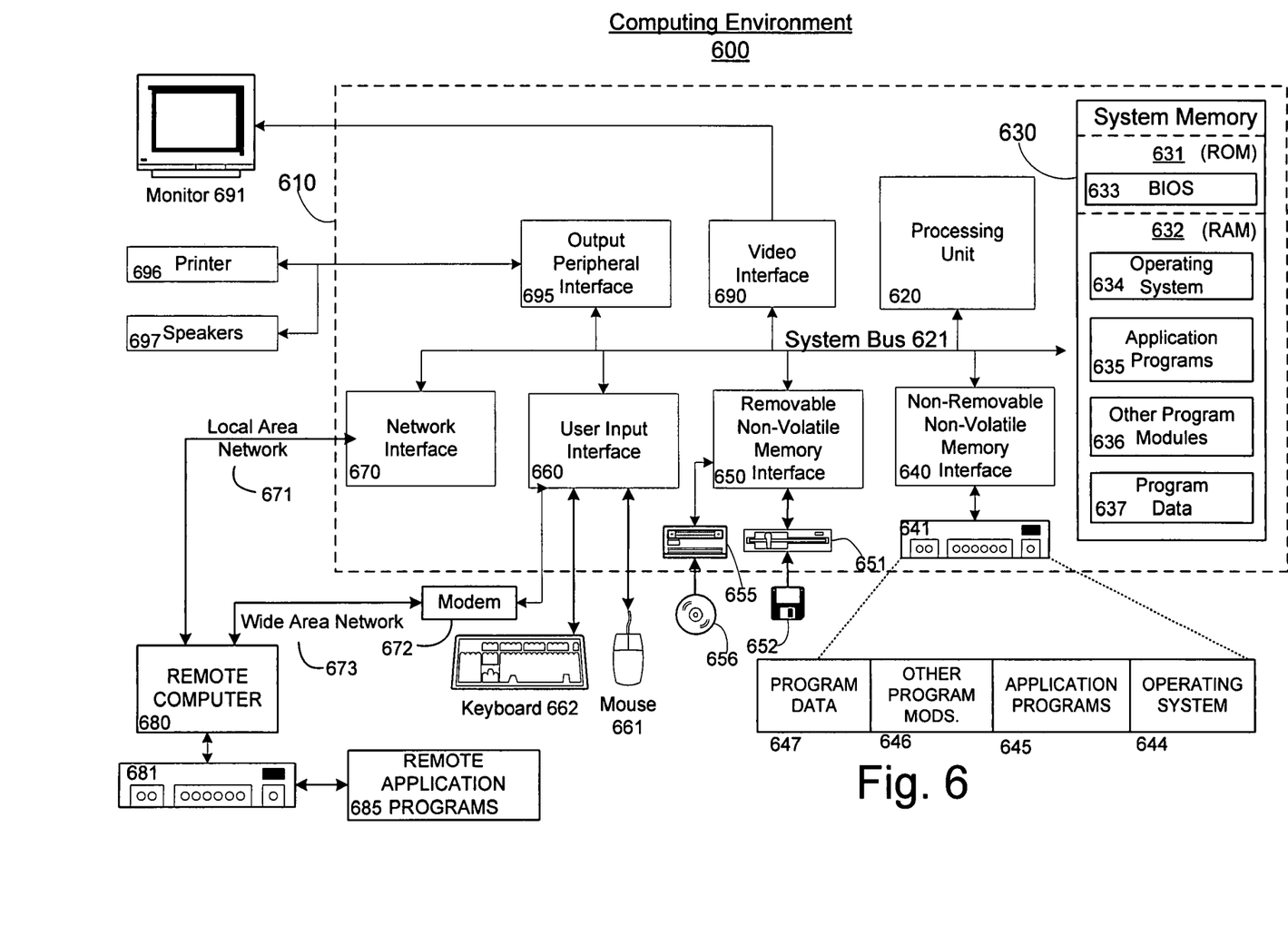
FIG. 6 is a block diagram showing an exemplary computing environment in which aspects of the invention may be implemented.

FIG. 6 and the following discussion are intended to provide a brief general description of a suitable computing environment in which embodiments of the invention may be implemented. While a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 6 thus illustrates an example of a suitable computing system environment 600 in which the embodiments of the invention may be implemented, although as made clear above, the computing system environment 600 is only one example of a suitable computing environment and is not intended to suggest any limitation as to the scope of use or functionality of an embodiment of the invention. Neither should the computing environment 600 be interpreted as having any dependency or requirement relating to any one or combination of components illustrated in the exemplary operating environment 600.

With reference to FIG. 6, an exemplary system for implementing an embodiment of the invention includes a general purpose computing device in the form of a computer system 610. Components of computer system 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 610 typically includes a variety of computer readable media. Computer readable media can be any available media that can be accessed by computer system 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer system 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer system 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6 provide storage of computer readable instructions, data structures, program modules and other data for the computer system 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer system 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690, which may in turn communicate with video memory (not shown). In addition to monitor 691, computer systems may also include other peripheral output devices such as speakers 697 and printer 696, which may be connected through an output peripheral interface 695.

The computer system 610 may operate in a networked or distributed environment using logical connections to one or more remote computers, such as a remote computer 680. The remote computer 680 may be a personal computer, a server, a router, a network PC, a peer device or other common network node, and typically includes many or all of the elements described above relative to the computer system 610, although only a memory storage device 681 has been illustrated in FIG. 6. The logical connections depicted in FIG. 6 include a local area network (LAN) 671 and a wide area network (WAN) 673, but may also include other networks/buses. Such networking environments are commonplace in homes, offices, enterprise-wide computer networks, intranets and the Internet.

When used in a LAN networking environment, the computer system 610 is connected to the LAN 671 through a network interface or adapter 670. When used in a WAN networking environment, the computer system 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer system 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a system useful for performing consistency checks on database backups. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed is:

1. A method for performing a consistency check on a database backup, the method comprising:
   generating a list of pages to retrieve from a database backup;
   retrieving the pages in the list by reading the database backup;
   creating a database view from the database backup; wherein the database view requires less memory space than the database contained in the database backup;
   copying a transaction log and the retrieved pages into the database view;
   recovering the database view to a transaction consistent state; and
   performing a consistency check on the database backup by reading all database pages from one of the database backup and the database view.

2. The method of claim 1, wherein generating a list of pages to retrieve from a backup of a database comprises generating a page list containing at least one of allocation and metadata pages, pages that were changed in the database while the database backup was being created, pages that contain uncommitted results as of the completion of the database backup and pages necessary to perform logical undo operations.

3. The method of claim 2 wherein generating a page list containing pages necessary to perform logical undo operations comprises using a key contained in a log record for an update to determine which interior node pages of a B-tree are needed to perform a logical undo operation for a particular log record.

4. The method of claim 1, wherein generating the list of pages comprises scanning the transaction log in the database backup for pages changed during creation of the database backup.

5. The method of claim 1, wherein retrieving the pages in the list comprises reading a full database backup once only and copying the pages in the list to the database view.

6. The method of claim 1, wherein creating a database view from the database backup further comprises creating a database view reflecting the contents of a database backup at a specific point in time.

7. The method of claim 1, wherein copying a transaction log comprises copying a transaction log containing transactions that occurred while the database was being backed up.

8. The method of claim 1, wherein recovering the database view to a transaction consistent state further comprises performing redo operations on pages that did not reflect all of the changes that occurred during the database backup operation.

9. The method of claim 8, wherein the redo operation is based on an associated transaction log whereby all committed transactions are reflected in the database view.

10. The method of claim 8, further comprising performing undo operations on pages based on the associated transaction log such that the effects of all uncommitted transactions are removed from the database view.

11. The method of claim 1, further comprising reading the database backup only twice; once for locating the pages in the list and once while performing the consistency check.

12. The method of claim 1, further comprising delaying the consistency check until the database view has been made transactionally consistent.

13. The method of claim 1, further comprising performing the consistency check using the database backup and the transactionally consistent database view.

14. The method of claim 13, wherein performing a consistency check comprises:
   reading all pages from the database view once: and
   using a page from the database view in the consistency check if a corrected version of the page exists in the database view.

15. The method of claim 14, further comprising using a page from the database backup in the consistency check if a corrected version of the page does not exist in the database view.

16. The method of claim 13, further comprising ensuring that all pages not found in the database backup, but instead found only in the view, are included in the consistency check.

17. A system comprising:
an input device for receiving at least one of database backup information and log transaction data;
a processor having access to memory, the memory having instructions of a software component; and
a software component, which when executed, performs a method comprising:
generating a list of pages to retrieve from a database backup;
retrieving the pages in the list by accessing the database backup;
creating a database view from the database backup; wherein the database view requires less memory space than the database contained in the database backup;
copying a transaction log and the retrieved pages into the database view;
recovering the database view to a transaction consistent state; and
performing a consistency check on the database backup using the database backup and the transaction consistent database view.

18. The system of claim 17, wherein the software component step of performing a consistency check comprises:
reading all pages from the database view once: and
using a page from the database view in the consistency check if a corrected version of the page exists in the database view.

19. The system of claim 18, further comprising using a page from the database backup in the consistency check if a corrected version of the page does not exist in the database view.

20. The system of claim 17, wherein the software component step of performing a consistency check further comprises ensuring that all pages not found in the database backup, but instead found only in the view, are included in the consistency check.

21. The system of claim 17, further comprising a display device for monitoring the status of the consistency check.

22. The system of claim 17, wherein the database backup comprises one of sequential storage, disk storage and random access storage.

23. The system of claim 17, wherein the software component method further comprises reading the database backup only twice; once for locating the list of pages and once while performing the consistency check.

24. The system of claim 17, wherein the software component step of generating the list of pages comprises scanning the transaction log in the database backup for pages changed during creation of the database backup.

25. The system of claim 17, wherein the software component step of generating a page list containing pages necessary to perform logical undo logical undo operations comprises using a key contained in a log record for an update to determine which interior node pages of a B-tree are needed to perform a logical undo operation for a particular log record.

26. The system of claim 17, wherein the software component step of creating a database view from the database backup further comprises creating a database view reflecting the contents of a database backup at a specific point in time.

27. The system of claim 17, wherein the software component step of recovering the database view to a transaction consistent state further comprises performing undo and redo operations on pages based on an associated transaction log such that all committed operations are reflected in the database view and all uncommitted transactions are removed from the database view.

28. A computer-readable medium having computer-executable instructions for performing a method of running a consistency check on a database backup, the method comprising:
generating a list of pages to retrieve from a database backup;
retrieving the pages in the list by reading the database backup;
creating a database view from the database backup; wherein the database view requires less memory space than the database contained in the database backup;
copying a transaction log and the retrieved pages into the database view;
recovering the database view to a transaction consistent state; and
performing a consistency check on the database backup by reading all database pages from one of the database backup and the database view.

29. The computer-readable medium of claim 28, wherein the step of generating a list of pages to retrieve from a database backup further comprises generating a page list containing at least one of allocation and metadata pages, pages that were changed in the database while the database backup was being created, pages that contain uncommitted results as of the completion of the backup and pages necessary to perform logical undo operations.

30. The computer-readable medium of claim 28, wherein the step of generating the list of pages comprises scanning the transaction log in the database backup for pages changed during creation of the database backup.

31. The computer-readable medium of claim 28, wherein the step of retrieving the pages in the list comprises reading a full database backup.

32. The computer-readable medium of claim 28, wherein the step of creating a database view from the database backup further comprises creating a database view reflecting the contents of a database backup at a specific point in time.

33. The computer-readable medium of claim 28, wherein the step of copying a transaction log comprises copying a transaction log containing transactions at the time the database backup was completed.

34. The computer-readable medium of claim 28, wherein the step of recovering the database view to a transaction consistent state further comprises performing undo and redo operations on transactions based on an associated transaction log such that uncommitted transactions are removed from the recovered database view.

35. The computer-readable medium of claim 28, further comprising the step of reading the database backup only twice; once for locating the list of pages and once while performing the consistency check.

* * * * *